Aug. 22, 1950     J. H. SMALL     2,520,019
MICROSCOPE OBJECTIVE
Filed March 6, 1947

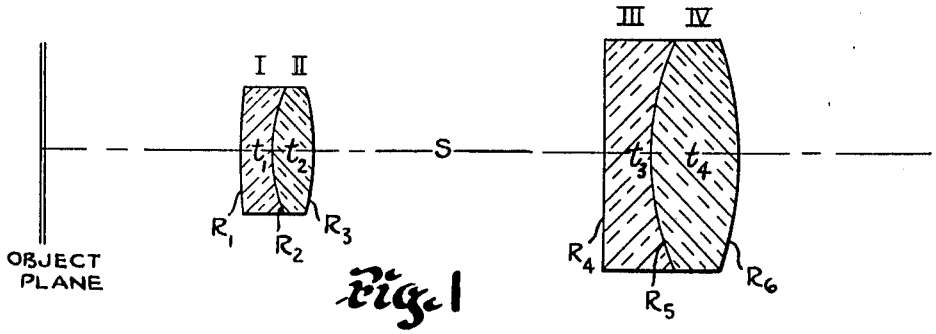

Fig. 1

| N.A. = 0.25 | | F = 1 mm | W.D. = 0.4889 |
|---|---|---|---|
| LENS | $N_D$ | $\vartheta$ | RADII | SPACINGS |
| I | 1.617 | 36.6 | $R_1 = +1.442$ | $t_1 = 0.09355$ |
| II | 1.517 | 64.5 | $R_2 = +0.3825$ | $t_2 = 0.10$ |
| | | | $R_3 = -0.609$ | $S = 0.7237$ |
| III | 1.617 | 36.6 | $R_4 = +9.303$ | $t_3 = 0.1252$ |
| IV | 1.523 | 58.6 | $R_5 = +0.666$ | $t_4 = 0.2187$ |
| | | | $R_6 = -0.893$ | |

Fig. 2

| N.A. = 0.25 | | F = 1 mm | W.D. = 0.4417 |
|---|---|---|---|
| LENS | $N_D$ | $\vartheta$ | RADII | SPACINGS |
| I | 1.617 | 36.6 | $R_1 = +1.305$ | $t_1 = 0.09373$ |
| II | 1.517 | 64.5 | $R_2 = +0.3491$ | $t_2 = 0.1875$ |
| | | | $R_3 = -0.6153$ | $S = 0.7085$ |
| III | 1.617 | 36.6 | $R_4 = +9.302$ | $t_3 = 0.1248$ |
| IV | 1.523 | 58.6 | $R_5 = +0.6658$ | $t_4 = 0.2185$ |
| | | | $R_6 = -0.8933$ | |

Fig. 3

| N.A. = 0.25 | | F = 1 mm | W.D. = 0.4204 |
|---|---|---|---|
| LENS | $N_D$ | $\vartheta$ | RADII | SPACINGS |
| I | 1.649 | 33.8 | $R_1 = +1.207$ | $t_1 = 0.09371$ |
| II | 1.511 | 63.5 | $R_2 = +0.3721$ | $t_2 = 0.1874$ |
| | | | $R_3 = -0.5526$ | $S = 0.7702$ |
| III | 1.617 | 36.6 | $R_4 = +9.037$ | $t_3 = 0.1271$ |
| IV | 1.523 | 58.6 | $R_5 = +0.6788$ | $t_4 = 0.2189$ |
| | | | $R_6 = -0.9163$ | |

Fig. 4

INVENTOR.
JOHN H. SMALL
BY
*Herbert C. Kimball*
ATTORNEY

Patented Aug. 22, 1950

2,520,019

UNITED STATES PATENT OFFICE 2,520,019

MICROSCOPE OBJECTIVE

John H. Small, Buffalo, N. Y., assignor to American Optical Company, Southbridge, Mass., a voluntary association of Massachusetts Application March 6, 1947, Serial No. 732,911

8 Claims. (Cl. 88—57)

This invention relates to a microscope objective and more particularly to a microscope objective of the type having a front doublet spaced from a rear doublet.

Since microscope objectives are relatively expensive items for students and other to purchase, it is sometimes the practice to provide such a microscope objective having its members corrected in such a way that the back doublet may be used alone as a low power objective.

An object of the present invention is to reduce the coma, astigmatism and chromatic aberration and to balance the spherical aberration of the microscope objective as a whole while at the same time providing a back doublet which if desired may be used alone as a low power objective whose spherical aberration is balanced and whose chromatic aberration is reasonably reduced.

The optical system of the microscope objective is further characterized by a rather long working distance for a system having a comparatively short equivalent focal length.

In accomplishing my purpose I have found that the radius of the front surface of the flint element of the front doublet should be about twice the radius of the back surface of the crown element and preferably not more than about three times. At the same time, the interface should have a radius of between one-half and two-thirds of the radius of the back surface of the crown element.

In the drawings:

Fig. 1 is a central sectional view through an optical system embodying my invention; and Figs. 2, 3 and 4 show the specifications of three illustrative embodiments of my invention.

The microscope objective is made up of two similarly arranged doublets, the front doublet consisting of a front convex-concave negative flint element I cemented to a back bi-convex positive crown element II. Spaced from this front doublet is a similar back doublet consisting of a front convex-concave negative flint element III cemented to a back bi-convex positive crown element IV.

The first of three different specifications for microscope objectives embodying the invention is as follows:

| Lens | $N_D$ | V | Radii | Spacings |
|---|---|---|---|---|
| I | 1.617 | 36.6 | $R_1=+1.442$ | $t_1=0.09355$ |
| II | 1.517 | 64.5 | $R_2=+0.3825$ | $t_2=0.10$ |
| | | | $R_3=-0.609$ | $s=0.7237$ |
| III | 1.617 | 36.6 | $R_4=+9.303$ | $t_3=0.1252$ |
| IV | 1.523 | 58.6 | $R_5=+0.666$ | $t_4=0.2187$ |
| | | | $R_6=-0.893$ | |

The second specification is as follows:

| Lens | $N_D$ | V | Radii | Spacings |
|---|---|---|---|---|
| I | 1.617 | 36.6 | $R_1=+1.305$ | $t_1=0.09373$ |
| II | 1.517 | 64.5 | $R_2=+0.3491$ | $t_2=0.1875$ |
| | | | $R_3=-0.6153$ | $s=0.7085$ |
| III | 1.617 | 36.6 | $R_4=+9.302$ | $t_3=0.1248$ |
| IV | 1.523 | 58.6 | $R_5=+0.6658$ | $t_4=0.2185$ |
| | | | $R_6=-0.8933$ | |

The third specification is as follows:

| Lens | $N_D$ | V | Radii | Spacings |
|---|---|---|---|---|
| I | 1.649 | 33.8 | $R_1=+1.207$ | $t_1=0.09371$ |
| II | 1.511 | 63.5 | $R_2=+0.3721$ | $t_2=0.1874$ |
| | | | $R_3=-0.5526$ | $s=0.7702$ |
| III | 1.617 | 36.6 | $R_4=+9.037$ | $t_3=0.1271$ |
| IV | 1.523 | 58.6 | $R_5=+0.6788$ | $t_4=0.2189$ |
| | | | $R_6=-0.9163$ | |

In the back doublet I find it advantageous to use in place of the customary boro-silicate crown a spectacle crown glass having an index of refraction 1.523 with reference to the D line of the spectrum and a dispersive index 58.6.

It will be noted that the specifications of the curvatures and thicknesses of the elements of the back doublet in all of these embodiments of my invention are approximately the following:

| Radii | Thicknesses |
|---|---|
| $R_4=+9$ F | $t_3=0.125$ F |
| $R_5=+0.67$ F | $t_4=0.22$ F |
| $R_6=-0.9$ F | |

The preferred form of my invention is set forth in Fig. 2. Here, the front negative flint element is made of medium flint and the back positive crown element is made of boro-silicate crown. The specifications of the curvatures and thicknesses of the elements of the front doublet of the preferred form are approximately:

| Radii | Thicknesses |
|---|---|
| $R_1=+1.4$ F | $t_1=0.09$ F |
| $R_2=0.4$ F | $t_2=0.1$ F |
| $R_3=-0.6$ F | |

In Fig. 4 are the specifications of a system which is highly desirable from the point of view of minimizing coma, astigmatism and chromatic aberration and balancing the spherical aberration provided the dense flint element is not subjected to the usual wear and tear of a microscope objective. Dense flint is sufficiently soft and unstable so that for most purposes I prefer the embodiment set forth in Fig. 2.

In all three embodiments of my invention the numerical aperture is 0.25.

It will be noted that the working distance, which in the first embodiment is about 0.49 F in the second embodiment is about 0.44 F and in the third embodiment is about 0.42 F, is rather long for an objective such as is here described which has a comparatively short equivalent focal length F.

While I have described certain embodiments of my invention including a preferred form thereof, it will be understood that my invention may be otherwise embodied and practiced within the scope of the following claims.

Having described my invention, I claim:

1. A microscope objective of the type having a front doublet spaced from a rear doublet and corrected to reduce coma, astigmatism and chromatic aberration and to balance the spherical aberration, said objective comprising a rear doublet made up of a convex-concave negative flint and a positive bi-convex crown and corrected to reduce chromatic aberration and balance the spherical aberration so as to be usable both as a part of the composite objective and separately as an objective per se, and a front doublet made up of a convex-concave negative flint element and a bi-convex positive crown element in contiguous relation, the radius of the front surface of the flint element of the front doublet being between approximately 1.2 and 1.44 times the effective focal length of the objective and approximately twice the radius of the back surface of the crown element thereof, and the interface therebetween being between approximately ½ and ⅔ of the radius of the back surface of the crown element thereof, the spacing between said doublets being approximately 0.7 to 0.8 times said effective focal length.

2. A microscope objective as claimed in claim 1 in which the rear doublet is made up of a medium flint element whose index of refraction with reference to the D line of the spectrum is approximately 1.617 and whose dispersive index is approximately 36.6, and a spectacle crown element whose index of refraction with reference to said D line is approximately 1.523 and whose dispersive index is approximately 58.6.

3. A microscope objective of the type having a front doublet spaced from a rear doublet and corrected to reduce coma, astigmatism and chromatic aberration and to balance the spherical aberration, said objective comprising two similarly arranged doublets each having a front convex-concave negative flint element cemented to a back bi-convex positive crown element, the back doublet being corrected to be usable both as a part of the composite objective and as an objective per se, and being made up of a medium flint element whose index of refraction with reference to the D line of the spectrum is 1.617 and whose dispersive index is 36.6, cemented to a spectacle crown element whose index of refraction with reference to the D line of the spectrum is 1.523 and whose dispersive index is 58.6, the specifications of the curvatures and thicknesses of the elements of said back doublet based on F the effective focal length of the objective being approximately:

| Radii | Thicknesses |
|---|---|
| $R_4 = +9\,F$ | $t_3 = 0.125\,F$ |
| $R_5 = +0.67\,F$ | $t_4 = 0.22\,F$ |
| $R_6 = -0.9\,F$ | | the front doublet having the radius of the front surface of the flint element about twice the radius of the back surface of the crown element, and the radius of the interface between about one-half and two-thirds of the radius of the back surface of the crown element.

4. A microscope objective corrected to reduce the amount of coma, astigmatism and chromatic aberration and to balance the spherical aberration, and having approximately the following specifications:

| Lens | $N_D$ | V | Radii | Spacings |
|---|---|---|---|---|
| I | 1.617 | 36.6 | $R_1 = +1.44\,F$ | $t_1 = 0.09\,F$ |
| II | 1.517 | 64.5 | $R_2 = +0.38\,F$ | $t_2 = 0.1\,F$ |
| | | | $R_3 = -0.61\,F$ | $s = 0.72\,F$ |
| III | 1.617 | 36.6 | $R_4 = +9.3\,F$ | $t_3 = 0.125\,F$ |
| IV | 1.523 | 58.6 | $R_5 = +0.67\,F$ | $t_4 = 0.22\,F$ |
| | | | $R_6 = -0.89\,F$ | | where the Roman numerals refer to elements starting with the short conjugate or front side, $N_D$ is the index of refraction with reference to the D line of the spectrum, V is the dispersive index, $R_1$ to $R_6$ are the radii of curvature of the refractive surfaces consecutively from front to rear, the + and − signs refer respectively to surfaces convex and concave to the front, $t_1$ to $t_4$ are the axial thicknesses of the elements, $s$ is the air space thickness between elements II and III, the contacting surfaces of the doublet members being cemented, and F is the equivalent focal length of the objective.

5. A microscope objective of the type having a front doublet spaced from a rear doublet and corrected to reduce coma, astigmatism and chromatic aberration and to balance the spherical aberration, said objective comprising two similarly arranged doublets each having a front convex-concave negative lens element and a back bi-convex positive lens element in contiguous relation, the rear doublet being corrected to reduce chromatic aberration and balance the spherical aberration so as to be usable both as a part of the composite objective and separately as an objective per se, and being made up of a medium whose index of refraction with reference to the D line of the spectrum is approximately 1.617 and whose dispersive index is approximately 36.6 and a medium whose index of refraction with reference to said D line is approximately 1.523 and whose dispersive index is approximately 58.6, the specifications of the curvatures and thicknesses of the elements of said rear doublet based on F the effective focal length of the objective being approximately:

| Radii | Thicknesses |
|---|---|
| $R_4=+9\ F$ | $t_3=0.125\ F$ |
| $R_5=+0.67\ F$ | $t_4=0.22\ F$ |
| $R_6=-0.9\ F$ | | the front doublet having the radius of the front surface of the negative element approximately twice the radius of the back surface of the positive element thereof, and the radius of the interface therebetween being approximately ½ to ⅔ of the radius of the back surface of said last mentioned positive element.

6. A microscope objective of the type having a pair of spaced doublets and corrected to reduce coma, astigmatism and chromatic aberration and to balance the spherical aberration, said objective comprising two similarly arranged doublets each having a front convex-concave negative lens element and a back bi-convex positive lens element in contiguous relation, the rear doublet being corrected to reduce chromatic aberration and to balance the spherical aberration so as to be usable both as a part of a composite objective and separately as an objective per se, said rear doublet being made up of a medium whose index of refraction with reference to the D line of the spectrum is approximately 1.617 and whose dispersive index is approximately 36.6 and a medium whose index of refraction with reference to said D line is approximately 1.523 and whose dispersive index is approximately 58.6. the specifications of the curvatures and thicknesses of the elements of said rear doublet based on F the effective focal length of the objective being between approximately:

| Radii | Thicknesses |
|---|---|
| $R_4=+9.037\ F$ to $+9.303\ F$ | $t_3=0.1248\ F$ to $0.1271\ F$ |
| $R_5=+0.666\ F$ to $+0.679\ F$ | $t_4=0.2185\ F$ to $0.2189\ F$ |
| $R_6=-0.893\ F$ to $-0.916\ F$ | | the front doublet being made up of a medium whose index of refraction with reference to said D line is between approximately 1.617 and 1.649 and whose dispersive index is between approximately 33.8 and 36.6 and a medium whose index of refraction with reference to said D line is between approximately 1.511 and 1.517 and whose dispersive index is between approximately 63.5 and 64.5, the specifications of the curvatures and thicknesses of the elements of said front doublet based on said effective focal length being between approximately:

| Radii | Thicknesses |
|---|---|
| $R_1=+1.207\ F$ to $+1.442\ F$ | $t_1=0.09355\ F$ to $0.09373\ F$ |
| $R_2=+0.3491\ F$ to $+0.3825\ F$ | $t_2=0.10\ F$ to $0.1875\ F$ |
| $R_3=-0.5526\ F$ to $-0.6153\ F$ | | the spacings between said doublet being between approximately 0.7085 and 0.7702 times said effective focal length.

7. A microscope objective corrected to reduce the amount of coma, astigmatism and chromatic aberration and to balance the spherical aberration, and having approximately the following specifications:

| Lens | $N_D$ | V | Radii | Spacings |
|---|---|---|---|---|
| I | 1.617 | 36.6 | $R_1=+1.31\ F$ | $t_1=0.09\ F$ |
| II | 1.517 | 64.5 | $R_2=+0.35\ F$ | $t_2=0.19\ F$ |
| | | | $R_3=-0.62\ F$ | $s=0.71\ F$ |
| III | 1.617 | 36.6 | $R_4=+9.3\ F$ | $t_3=0.125\ F$ |
| IV | 1.523 | 58.6 | $R_5=+0.67\ F$ | $t_4=0.22\ F$ |
| | | | $R_6=-0.89\ F$ | | where the Roman numerals refer to elements starting with the short conjugate or front side, $N_D$ is the index of refraction with reference to the D line of the spectrum, V is the dispersive index, $R_1$ to $R_6$ are the radii of curvature of the refractive surfaces consecutively from front to rear, the + and − signs refer respectively to surfaces convex and concave to the front, $t_1$ to $t_4$ are the axial thicknesses of the elements, $s$ is the air spacing between elements II and III, and F is the equivalent focal length of the objective.

8. A microscope objective corrected to reduce the amount of coma, astigmatism and chromatic aberration and to balance the spherical aberration, and having approximately the following specifications:

| Lens | $N_D$ | V | Radii | Spacings |
|---|---|---|---|---|
| I | 1.649 | 33.8 | $R_1=+1.21\ F$ | $t_1=0.09\ F$ |
| II | 1.511 | 63.5 | $R_2=+0.37\ F$ | $t_2=0.19\ F$ |
| | | | $R_3=-0.55\ F$ | $s=0.77\ F$ |
| III | 1.617 | 36.6 | $R_4=+9.04\ F$ | $t_3=0.127\ F$ |
| IV | 1.523 | 58.6 | $R_5=+0.68\ F$ | $t_4=0.22\ F$ |
| | | | $R_6=-0.92\ F$ | | where the Roman numerals refer to elements starting with the short conjugate or front side, $N_D$ is the index of refraction with reference to the D line of the spectrum, V is the dispersive index, $R_1$ to $R_6$ are the radii of curvature of the refractive surfaces consecutively from front to rear, the + and − signs refer respectively to surfaces convex and concave to the front, $t_1$ to $t_4$ are the axial thicknesses of the elements, $s$ is the air spacing between elements II and III, and F is the equivalent focal length of the objective.

JOHN H. SMALL.

REFERENCES CITED

The following references are of record in the file of this patent:

UNITED STATES PATENTS

| Number | Name | Date |
|---|---|---|
| 1,479,251 | Repp | Jan. 1, 1924 |
| 1,484,853 | Warmisham | Feb. 26, 1924 |
| 1,843,519 | Richter | Feb. 2, 1932 |
| 1,934,599 | Foster | Nov. 7, 1933 |